Patented Dec. 22, 1953

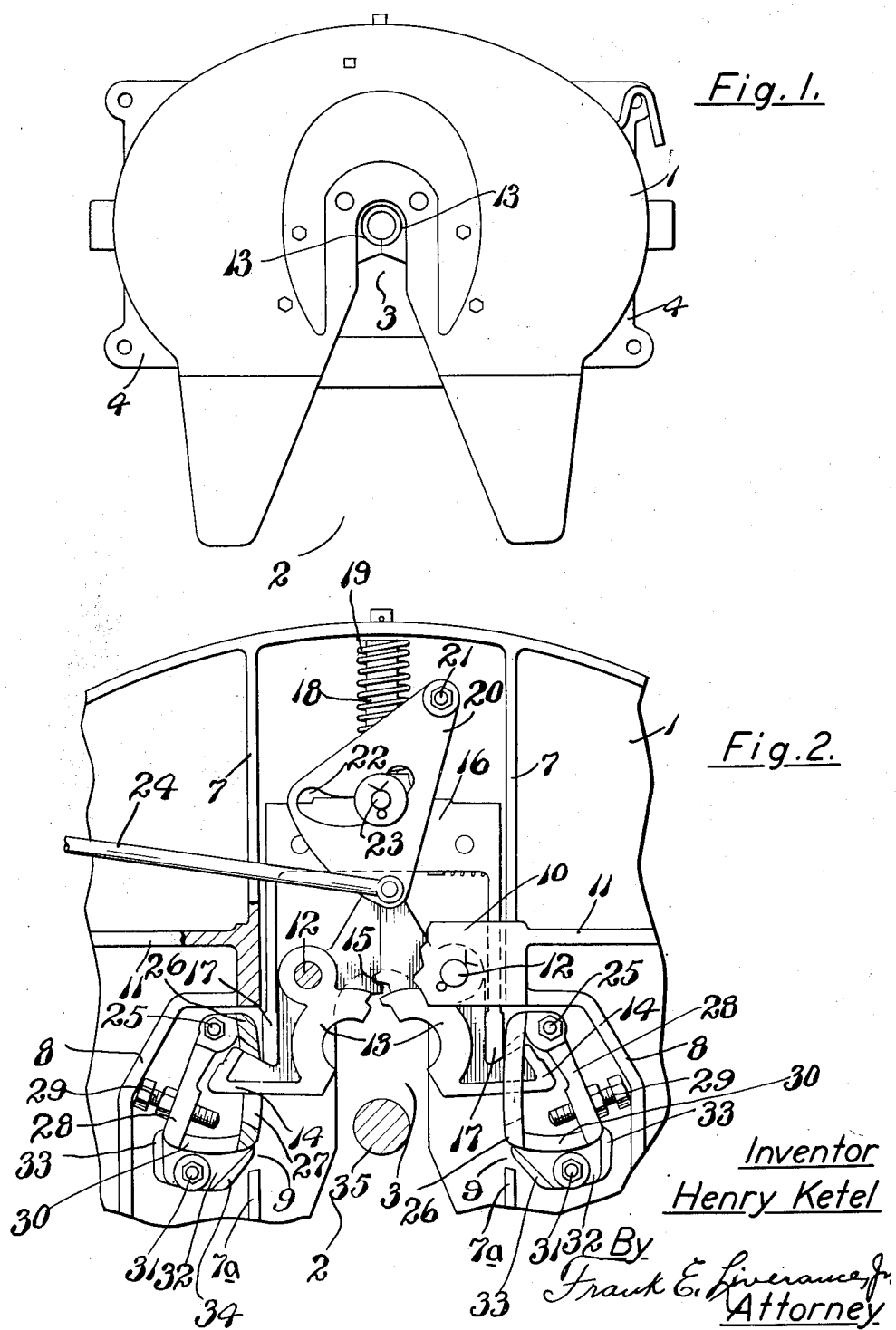

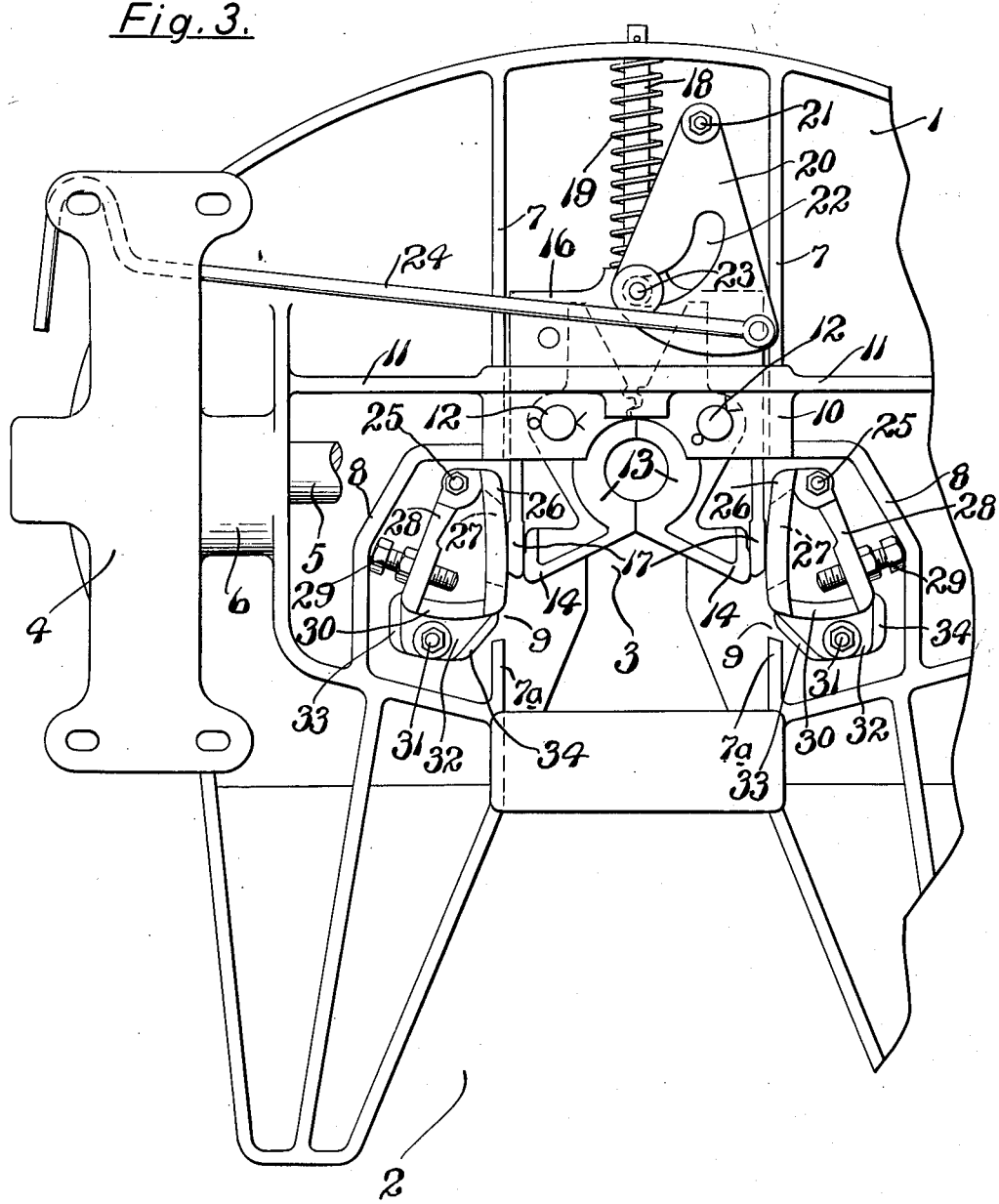

2,663,575

UNITED STATES PATENT OFFICE 2,663,575

FIFTH WHEEL JAW WEAR COMPENSATING MEANS

Henry Ketel, Los Angeles, Calif., assignor to Holland Hitch Company, Holland, Mich., a corporation of Michigan Application March 15, 1951, Serial No. 215,777

2 Claims. (Cl. 280—435)

This invention relates to improvements of fifth wheels, now used in making the connection between a truck or tractor and a trailer which is pulled thereby. Such trailers carry large bodies in which heavy loads are placed, the trailers being disconnected when being loaded, and connected by means of a heavy pin secured at the under side and front portion of the trailer body, which has a detachable connection with the fifth wheel permanently secured at the rear portion of and above the frame of an automotive tractor which is used to draw the trailer from one place to another.

The tractors pull the trailers with their loads over roads at high speeds and, between the tractor pin connection and the fifth wheel and in the fifth wheel itself, there occurs a very considerable amount of wear and under some conditions stresses and strains resulting therefrom, due to the swaying of the trailer and its load, irregularities in the road over which drawn and other things met with in moving the trailer by a tractor. This results in wear of the pin engaging jaws of the fifth wheel with other parts thereof, to provide worse conditions of lost motion which, in turn, increases the wear, whereby the fifth wheel structure in time becomes considerably worn, with resultant increasing damage to it.

It is a primary object and purpose of the present invention to provide, by means of novel structure in connection with a fifth wheel of the type noted, very practical and useful means for taking up the wear and the slack caused thereby, such means being very readily operated so that any wear at the places where it has been greatest heretofore is taken up and compensated for, and the fifth wheel placed in a substantially new condition, insofar as such wear and damage caused thereby are concerned.

An understanding of the invention may be had from the following description, taken in connection with the accompanying drawings, in which, Fig. 1 is a plan view of a conventional fifth wheel to which my invention is applied.

Fig. 2 is a fragmentary enlarged under view thereof, with the pin engaging jaws in open position, and Fig. 3 is a similar view with the jaws in closed position, both Figs. 2 and 3 showing the structure embodying my invention.

Like reference characters refer to like parts in the different figures of the drawings.

Included in the conventional fifth wheel of the type noted is a base plate 1 of cast metal, of the form best shown in Fig. 1 which, at its rear side, has a slot 2 widest at its rear end and with converging sides to meet the parallel sides of a narrower slot 3, having a closed inner end, the closed end portion of the slot 3 being substantially at the center of the plate 1 and over a horizontal mounting shaft 5 which, at its ends, is supported by spaced supports 4 under and at opposite side edges of the plate 1. The shaft 5 is received in suitable journals 6 at its ends either integral with or connected to the supports 4. The plate 1, therefore, may be tilted about the horizontal axis of the shaft 5.

The under side of the plate 1 is reinforced by integrally cast downwardly extending ribs. At the front portion of the fifth wheel plate, two spaced parallel ribs 7 are cast which reach inwardly as far as the closed end portion of the slot 3. From the inner ends of said ribs 7 other downwardly extending ribs 8 extend outwardly and thence to the rear to meet and connect with other reinforcing ribs (not numbered). The short ribs 7a at their inner or forward ends are aligned with ribs 7 but spaced from the rear ends thereof, providing open spaces 9, one at each side of the slot 3 in the plate 1, there being enclosed, except for said openings 9, portions of the plate 1 at its under side, by the ribs 8 and 7a and the ribs, unnumbered, which connect the rear end portions of such ribs 7a and 8.

A horizontal cross plate 10 is cast with and connects the inner end portions of the ribs 7a integral with which also are the ribs 11, disposed at right angles to the ribs 7 but in substantial alignment with the plate 10.

On the plate 10 are two spaced generally vertical pivot pins 12, one at each side at the inner closed end of the slot 3, on each of which a jaw 13 is pivotally mounted. Said jaws 13 are adapted when closed to encircle the draw pin on a trailer extending downwardly from its lower side at its front end portion. The jaws, with my invention, each at its rear end is provided with a laterally extending arm 14. Each of the arms terminates in a forwardly turned projection which lies at an angle less than a right angle to the outwardly extending part of the arm. The two jaws have a toothed engagement, shown at 15, whereby upon any movement of the one of the jaws the other simultaneously moves therewith, both jaws opening and closing simultaneously and in equal amounts. When the jaws are open, as shown in Fig. 2, the free end portions of the arms 14 pass through the openings or gaps 9 between the ribs 7a and 7 (Fig. 2).

A fork comprising a transverse end member 16 and two spaced rearwardly extending parallel side arms 17 is located between the ribs 7, the arms 17 passing underneath the plate 10. Such fork is normally moved to the rear, a rod 18 being connected to the cross member 16 and extending forwardly through a downwardly extending flange at the edge of the plate 1, with a coiled compression spring 19 around the rod 18 tending to push said fork to the rear and to the position in Fig. 3.

A triangular plate 20 is pivotally mounted at one of the apices, at 21, near the front end of the plate 1 and underneath it. The plate 20 has a curved slot 22 as shown. Through this slot a pin 23 extends, having a roller thereon, which roller is in the slot 22. A manually operable pull rod 24 is pivotally connected to the plate 20 adjacent the corner thereof shown. On an outward pull on said rod 24, plate 20 is swung about its pivot 21 from the position in Fig. 3 to that in Fig. 2, compressing spring 19 and moving the fork 16 in a forward direction from the position shown in Fig. 3 to that in Fig. 2.

Substantially within the previously mentioned spaces inwardly of the ribs 8, and mounted on pins 25, one in each of said spaces are shoes each having an inner side 26 the outer face of which is in the arc of a circle of relatively large radius, and outer side 28 extending from the pin 25 and diverging away therefrom said side 26 and through which a screw is threaded, the head of which is against the adjacent rib 8, adapted to be locked in any desired position by a lock nut the two rear ends of the sides 26 and 28 being connected by end cross member 30. Each of the sides 26 has an opening therethrough between its upper and lower edges, shown at 27. Such opening is of sufficient size that the free end portion of a jaw 14 may pass therethrough (Fig. 2). By actuating the screws 29 the inner faces of the shoes may be brought closer to each other or moved farther away from each other. Against such inner faces of the shoes the outer sides of the terminal thickened portions of the arms 17 are adapted to have bearing engagement, while the inner sides of said terminal portions of the arms 17 bear against the ends of the arms 14 of the jaws 13 (Fig. 3), when the jaws are closed.

At the outer end of each of the shoes mounted upon the pins 25 are members, one for each of said shoes each mounted to turn about a pivot pin 31 on the plate, each having a base 32 through which its pin 31 passes, and at the outer and inner ends of said base, sides 33 and 34 which engage, as shown, with the end portions of the inner sides 26 and the outer sides 28 of the adjustable shoes described; and which insures that said shoes are held against aimless movement or accidental undesirable changes of position.

With the jaws 13 open, as in Fig. 2, a truck may be backed into position with relation to the pin at 35 carried by the trailer, until the pin is between the jaws 13 which will automatically simultaneously swing inwardly toward each other to the position shown in Fig. 3 when the pin engages against the jaws. With the jaws open, the free end portions of the arms 14 pass through the slots 27, but upon the jaws closing, said arms are moved toward each other to the position in Fig. 3 and the outer sides of the ends of said jaws 14 are substantially parallel to and spaced from the adjacent inner sides 26 of the take-up shoes. On the release of the fork, so that spring 19 may operate, it is moved to the rear and the somewhat thickened free end portions of the sides 17 pass between the ends of the arms 14 and the adjacent inner sides 26 of the bearing shoes.

When wear occurs, as it will between the sides of the arms 17 and the contacting sides of shoes and the ends of the arms 14, it is readily taken up by adjusting the screws 29. The side arms 17 will yield sufficiently, if necessary so that there is always a snug engagement of the parts 26, 17 and 14 which may be maintained, as wearing away of the bearing parts occurs. The fifth wheel structure, therefor, may be maintained in substantially its initial condition, and will not develop a situation which would provide excessive lost motion, as for example in prior fifth wheels of the type shown in U. S. Patent No. 2,348,977, issued May 16, 1944, permitting undesired increase in wear and also increase in stresses and strains to which the parts may be subjected, as lost motion, because of wear, continually increases.

The invention is one which is particularly practical and useful and in test and service has proved very satisfactory.

The invention is defined in the appended claims and is to be considered comprehensive of all forms of structure coming within their scope.

I claim:

1. In a fifth wheel having a fifth wheel body, having an entrance for the passage therein of a cooperating connecting pin, said body having spaced apart ribs thereon parallel to each other and to said pin entrance, said fifth wheel having a pair of jaws pivotally mounted on said body between the guiding ribs, said jaws having recesses in adjacent sides adapted to receive a connecting pin, and each of said jaws outwardly of said recesses therein having a lateral extension, said extensions extending from the jaws opposite to each other, and each of said ribs having an opening for the lateral extensions of the jaws to pass therethrough when the jaws turn outwardly about their pivots, and said fifth wheel having a locking yoke with spaced parallel sides, parallel to and one located adjacent each of said ribs, and said fifth wheel having spring means operatively associated therewith for forcing the yoke in a direction to cause the sides thereof to engage the lateral extensions to said jaws and hold the jaws in closed position, the improvement comprising a member pivotally mounted adjacent the inner end of each thereof to the fifth wheel body, one at the outer side of each side of said yoke, each of said members having an inner side adapted to bear against the outer side of the adjacent side of said yoke, so that the sides of said yoke are between the outer ends of said lateral extensions and the inner sides of said movable members when the jaws are closed, said fifth wheel body having ribs extending therefrom one outwardly of each of said pivotally mounted members, and a screw threaded into the outer side of each of said members, the head of which is against the adjacent rib of said last mentioned ribs for maintaining the inner sides of said members in bearing engagement against the outer sides of the sides of said yoke, and for maintaining the inner sides of the sides of said yoke against said lateral extensions of the jaws when said jaws are closed.

2. A construction as defined in claim 1, said screws being disposed outwardly from the pivotal mountings of said movable members, and a retainer at the outer end of each of said movable members mounted to turn about a pivotal axis between the ends thereof, each of said retainers comprising a flat plate lying against the fifth wheel body and ends extending therefrom, the inner edges of said ends having operative engaging contact with the adjacent ends of said movable members for releasably holding said movable members against movement from any position to which adjusted.

HENRY KETEL.

References Cited in the file of this patent

UNITED STATES PATENTS

| Number | Name | Date |
|---|---|---|
| 2,219,415 | Fontaine | Oct. 29, 1940 |
| 2,348,977 | Ketel | May 16, 1944 |